United States Patent
Li et al.

(10) Patent No.: US 9,246,821 B1
(45) Date of Patent: Jan. 26, 2016

(54) SYSTEMS AND METHODS FOR IMPLEMENTING WEIGHTED COST MULTI-PATH USING TWO-LEVEL EQUAL COST MULTI-PATH TABLES

(71) Applicant: Google Inc., Mountain View, CA (US)

(72) Inventors: Jiangbo Li, Sunnyvale, CA (US); Qingxi Li, Mountain View, CA (US); Fei Ye, Mountain View, CA (US); Victor Lin, Fremont, CA (US)

(73) Assignee: Google Inc., Mountain View, CA (US)

( * ) Notice: Subject to any disclaimer, the term of this patent is extended or adjusted under 35 U.S.C. 154(b) by 100 days.

(21) Appl. No.: 14/166,271

(22) Filed: Jan. 28, 2014

(51) Int. Cl.
*H04L 12/803* (2013.01)
*H04L 12/54* (2013.01)
*H04L 12/18* (2006.01)
*H04L 12/761* (2013.01)

(52) U.S. Cl.
CPC .............. *H04L 47/125* (2013.01); *H04L 12/54* (2013.01); *H04L 12/18* (2013.01); *H04L 45/16* (2013.01)

(58) Field of Classification Search
CPC .............................. H04L 12/18; H04L 47/125
See application file for complete search history.

(56) References Cited

U.S. PATENT DOCUMENTS

| | | | |
|---|---|---|---|
| 7,606,161 B2 | 10/2009 | Kalkunte et al. | |
| 8,014,278 B1 | 9/2011 | Subramanian et al. | |
| 2003/0161310 A1* | 8/2003 | Dobbins et al. | 370/392 |
| 2008/0151863 A1* | 6/2008 | Lawrence et al. | 370/351 |
| 2010/0232322 A1* | 9/2010 | Umayabashi et al. | 370/256 |
| 2013/0083660 A1* | 4/2013 | Rajagopalan et al. | 370/235 |
| 2013/0286846 A1 | 10/2013 | Atlas et al. | |
| 2013/0301640 A9 | 11/2013 | Subramanian et al. | |
| 2014/0056178 A1* | 2/2014 | Tsai et al. | 370/256 |

* cited by examiner

*Primary Examiner* — Brian D Nguyen
*Assistant Examiner* — Toan Nguyen
(74) *Attorney, Agent, or Firm* — Edward A. Gordon; Foley & Lardner LLP

(57) ABSTRACT

This disclosure provides systems, methods, and apparatus for providing a network switch for implementing weighted cost multi-pathing (WCMP). In some implementations, the switch can implement equal cost multi-pathing (ECMP) using ECMP forwarding tables. The ECMP forwarding table may include more than one output port associated with a destination address of an incoming packet. The ECMP forwarding table may become undesirably large if unequal weights were assigned to the output ports. A multi-level ECMP table can be implemented that can allow assigning weights to the output ports while being relatively small. The multi-level ECMP table can include a first level where each entry includes at most a single output port. A second level can include entries having one or more output ports.

12 Claims, 7 Drawing Sheets

SYSTEMS AND METHODS FOR IMPLEMENTING WEIGHTED COST MULTI-PATH USING TWO-LEVEL EQUAL COST MULTI-PATH TABLES

TECHNICAL FIELD

This disclosure relates to the field of communication networks, and in particular to communication switches.

DESCRIPTION OF THE RELATED TECHNOLOGY

Equal cost multi-pathing (ECMP) is a commonly used technique in packet switching. ECMP is a routing strategy where next-hop packet forwarding to a single destination can occur over multiple paths. In such cases, an incoming packet may be forwarded via any one of the ports associated with the multiple paths. To achieve load balancing, the switch may randomly distribute incoming packets between the multiple paths. Random distribution assumes that each of the multiple paths have been assigned equal weights. However, in some cases unequal weights may need to be assigned to the multiple paths. Traditional approaches to generating ECMP forwarding tables with unequal weights can lead to undesirably large forwarding tables.

SUMMARY

According to one aspect, the subject matter described in this disclosure relates to a method for generating a forwarding table for a packet switch. The method includes receiving identities of a plurality of ports associated with at least one destination network address, receiving weights associated with each of the plurality of ports, and generating a multi-level equal cost multipath (ECMP) forwarding table based on the number of the plurality of ports and the received weights.

According to another aspect, the subject matter described in this disclosure relates to a packet network switch including a plurality of network ports, a switch matrix, and a forwarding table generating module. The plurality of network ports is configured to communicate data over one or more networks. The switch matrix is coupled to the plurality of network ports and is configured to selectively couple any one of the plurality of network ports to another one of the plurality of network ports. The forwarding table generating module is configured to receive identities of the plurality of network ports associated with at least one destination network address, receive weights associated with each of the plurality of network ports, and generate a multi-level ECMP forwarding table based on the number of the plurality of ports and the received weights.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
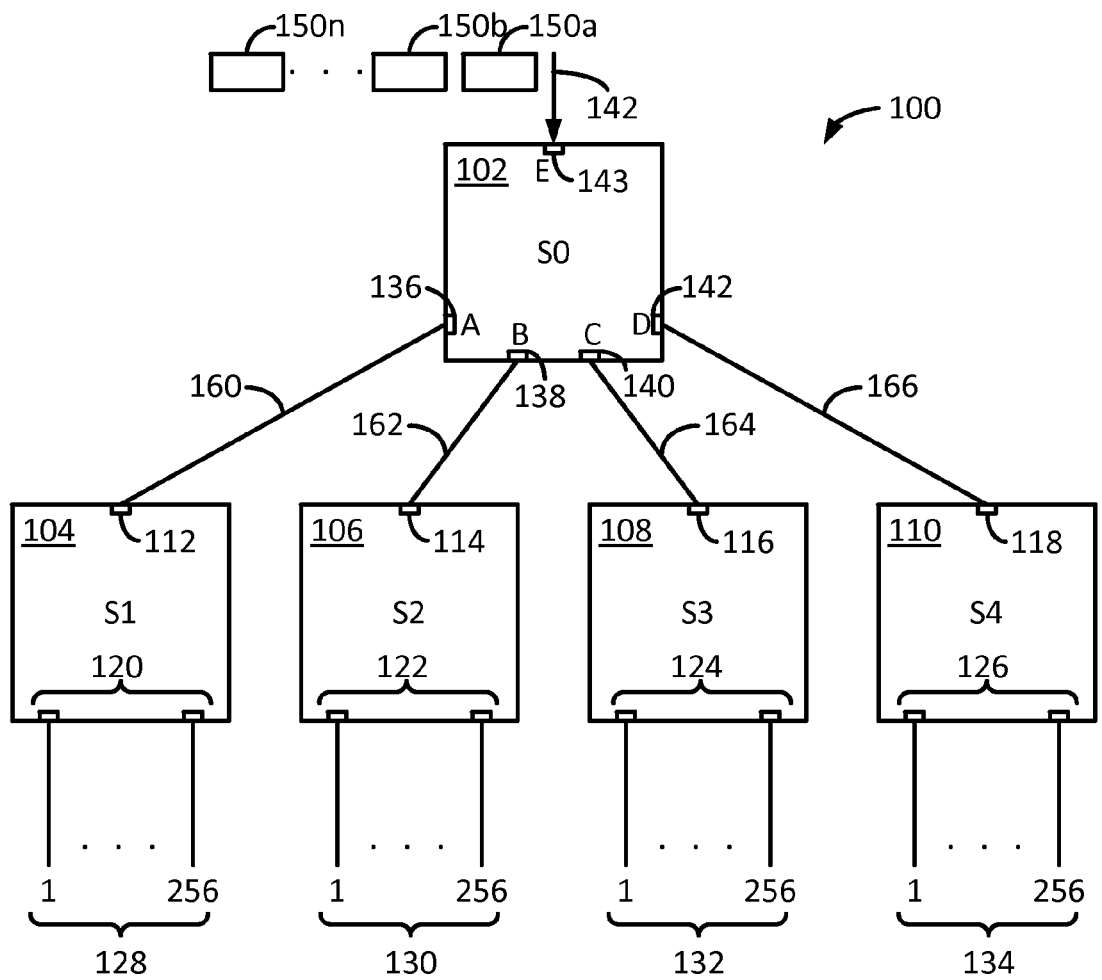
FIG. 1 shows a block diagram of an example network configuration.

FIG. 1 shows a block diagram of an example network configuration 100. In particular, FIG. 1 shows a network configuration 100 including four switches S0 102, S1 104, S2 106, S3 108, and S4 110. The switches S0-S4 102-110 can be network switches that can receive data packets at one or more of their respective ingress ports, and forward the received packets through one or more of their respective egress ports. Switch S0 102 can include several network ports, five of which are shown in FIG. 1. Specifically, the switch S0 102 includes port A 136, port B 138, port C 140, port D 142, and port E 143. Ports A-E 136-143 can be any network interface ports such as an Ethernet port, a Fibre Channel port, etc., and can both receive and transmit data over their respective links. In some implementations, the ports A-E 136-143 can be layer-3 or network layer ports (as described in the Open Systems Interconnection (OSI) model).

Switch S0 can communicate with the switches S1 104, S2 106, S3, 108, and S4 110 via ports A 136, port B 138, port C 140, and port D 142 respectively. Link 160 can couple port A 136 on switch S0 102 to port 112 on switch S1 104, link 162 can couple port B 138 on switch S0 102 to port 114 on switch S2 106, link 164 can couple port C 140 on switch S0 102 to port 116 on switch S3 108, and link 166 can couple port D 142 on switch S0 102 to port 118 on switch S4 110. Furthermore, switch S1 104 can include a first set of ports 120 coupled to a first set of links 128, switch S2 106 can include a second set of ports 122 coupled to a second set of links 122, switch S3 108 can include a third set of ports 124 coupled to a third set of links 132, and switch S4 110 can include a fourth set of ports 126 coupled to a fourth set of links 134.

During operation, the switch S0 102 may receive one or more packets at one of its ports. For example the switch S0 102 may receive a series of packets 150*a*-150*n* at port E 143. Generally, the switch S0 102 can examine the destination address of each of the packets received at port E 143 and refer to a forwarding table to determine how the packets should be routed. The forwarding table can map destination addresses (or any other information associated with the packet) to a port on the switch S0 102. The switch S0 102 can then transmit the received packet via the port associated with the destination address. For example, the forwarding table may map the destination address of the packet 150*a* to port A 136.

In some implementations, an equal cost multi path (ECMP) technique may be utilized in generating an ECMP forwarding table. In some such implementations, the ECMP forwarding table may associate more than one port (or an ECMP group of ports) with a particular destination address. Generally, this means that the cost of transmitting the received packet to its destination address via any one of the multiple ports is equal. The cost may include number of hops, packet latency, etc., or a function of any combination thereof.

For example, referring to FIG. 1, each of switches S1 104, S2 106, S3, 108, and S4 110 include 256 individual ports (ports 120, 122, 124, and 126, respectively) coupled to 256 individual links (links 128, 130, 132, and 134, respectively). It is assumed that all links 128, 130, 132, and 134 reach the same set of host machines, and that the cost of transmission via each of the 1024 links is equal. Furthermore, the cost of transmission from the switch S0 102 to each of the switches S1 104, S2 106, S3, 108, and S4 110 via the ports A 136, B 138, C 140 and D 142 is also equal.

Thus, when the switch S0 102 receives packets destined to one of the set of host machines reachable by the 1024 links, the switch S0 102 can distribute transmission of packets equally via ports A 136, B 138, C 140 and D 142. Viewed differently, the switch S0 102 can use a relative distribution ratio of 256:256:256:256 to distribute packets between the ports A 136, B 138, C 140 and D 142. As the ratios are equal, the ECMP forwarding table may include only 4 entries, one for each of the four ports A 136, B 138, C 140 and D 142. Thus, when a packet is received, the switch may pseudo-randomly select one of the four entries in the ECMP forwarding table. In some implementations, the switch S0 102 may utilize a hashing function to pseudo-randomly select one out of all eligible ECMP ports. In some implementations, the switch S0 may identify and maintain an ECMP group associated with each destination address, where the ECMP group includes a list of all equal cost ports for transmitting packets to the associated destination address. The contents and size of the ECMP group can be similar to the ECMP forwarding table. For example, the switch S0 102 can maintain an ECMP group including ports A 136, B 138, C 140 and D 142. In some implementations, the switch S0 102 may utilize the ECMP group for generating the ECMP forwarding table.

In some implementations, the distribution of traffic may not be equal. For example, if one of the 256 links in the fourth set of links 134 coupled to the fourth set of ports 126 of the switch S4 110 were to become inoperable, then the number of equal cost paths via port D 142 would reduce from 256 to 255. Thus, to maintain a balanced distribution of packets between ports A 136, B 138, C 140 and D 142, the switch 102 would utilize a weighted relative distribution ratio of 256:256:256:255.

Figure 2:
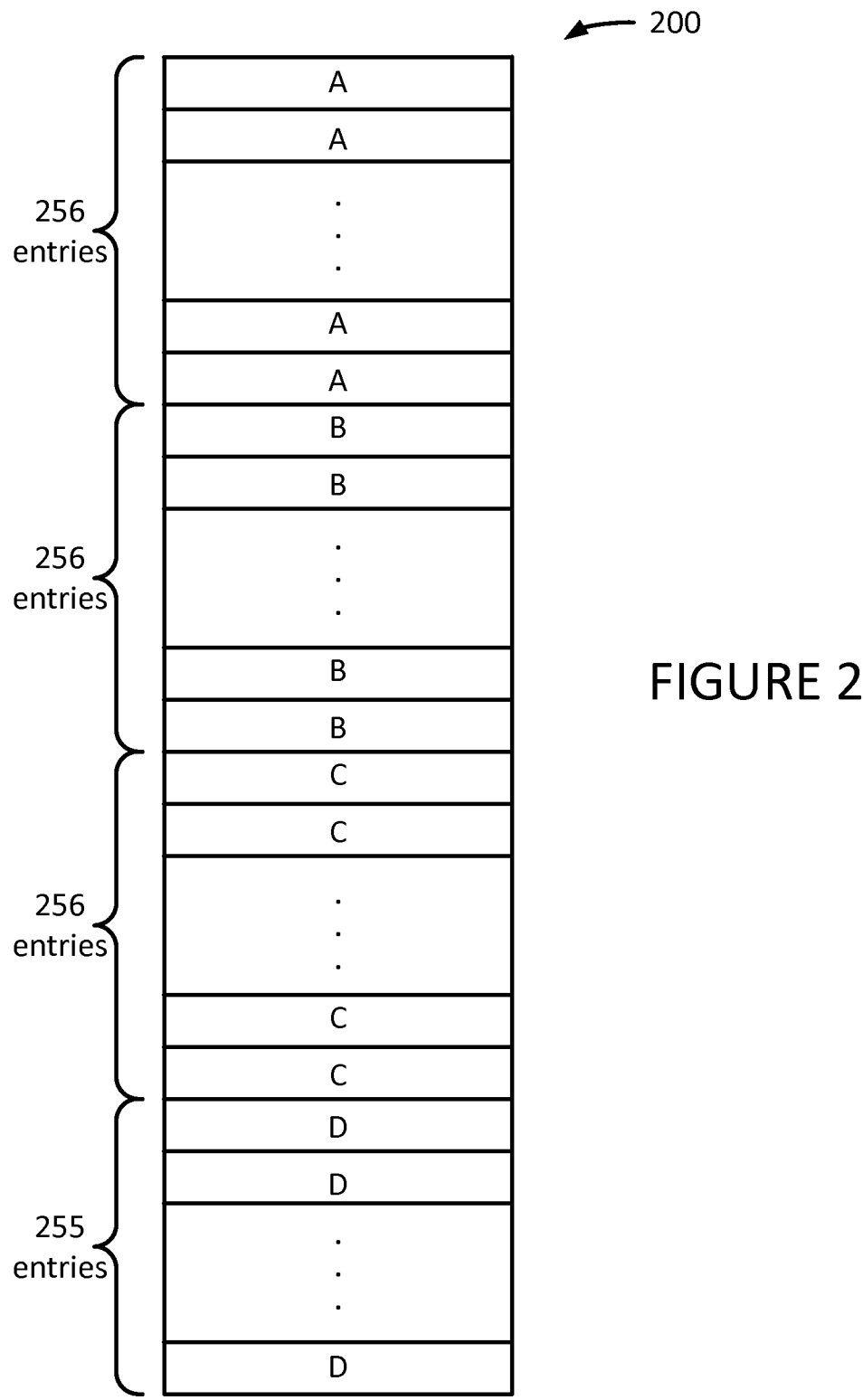
FIG. 2 shows a first example ECMP forwarding table.

FIG. 2 shows a first example ECMP forwarding table 200. In particular, FIG. 2 shows the first example ECMP forwarding table 200 for the switch S0 102 shown in FIG. 1. The forwarding table 200 utilizes a distribution ratio of 256:256:256:255 for distribution of packets between the four ports A 136, B 138, C 140 and D 142. The forwarding table 200 includes 1023 entries such that 256 entries include port A, 256 entries include port B, 256 entries include port C, and 255 entries include port C. The switch S0 can then pseudo-randomly select one of the 1023 entries from the forwarding table 200 for selecting a port through which the packet is to be transmitted. In some implementations, the switch S0 can identify and maintain a weighted cost multi-path (WCMP) group associated with each destination address for which the distribution of traffic among a set of ports is unequal. In some implementations, the WCMP group can include a set of ports in addition to the distribution weights associated with them. For example, for a destination address, the switch S0 102 can maintain a WCMP group including ports A 136, B 138, C 140 and D 142. The WCMP group can also include distribution weight of 256 associated with each of the ports A, B, and C is 256, and the distribution weight of 255 associated with the port D. The WCMP group is different from the ECMP group in that the WCMP group explicitly includes distribution weights associated with the member ports, while the ECMP group by not including distribution weights, implicitly indicates that the distribution weights for each of the member ports is equal.

While the forwarding table 200 may be effective in implementing a distribution ratio of 256:256:256:255, its size of over a thousand entries may be undesirably large. Moreover, a switch may need to maintain ECMP tables for multiple ECMP groups corresponding to multiple destination addresses, thereby multiplying the number of ECMP table entries maintained to serve the combined set of groups. This total number of entries can grow to be quite burdensome given the limited memory resources of many hardware switches. Such switches generally can accommodate only a few thousand entries. Thus, if the ECMP forwarding tables were large, then the switch hardware resources, and the costs associated with it, would have to be increased. Therefore, it is preferable to have smaller ECMP forwarding tables. As discussed below, the size of the ECMP forwarding tables can be reduced by utilizing hierarchical ECMP forwarding tables for implementing weighted relative distribution ratios.

Figure 3:
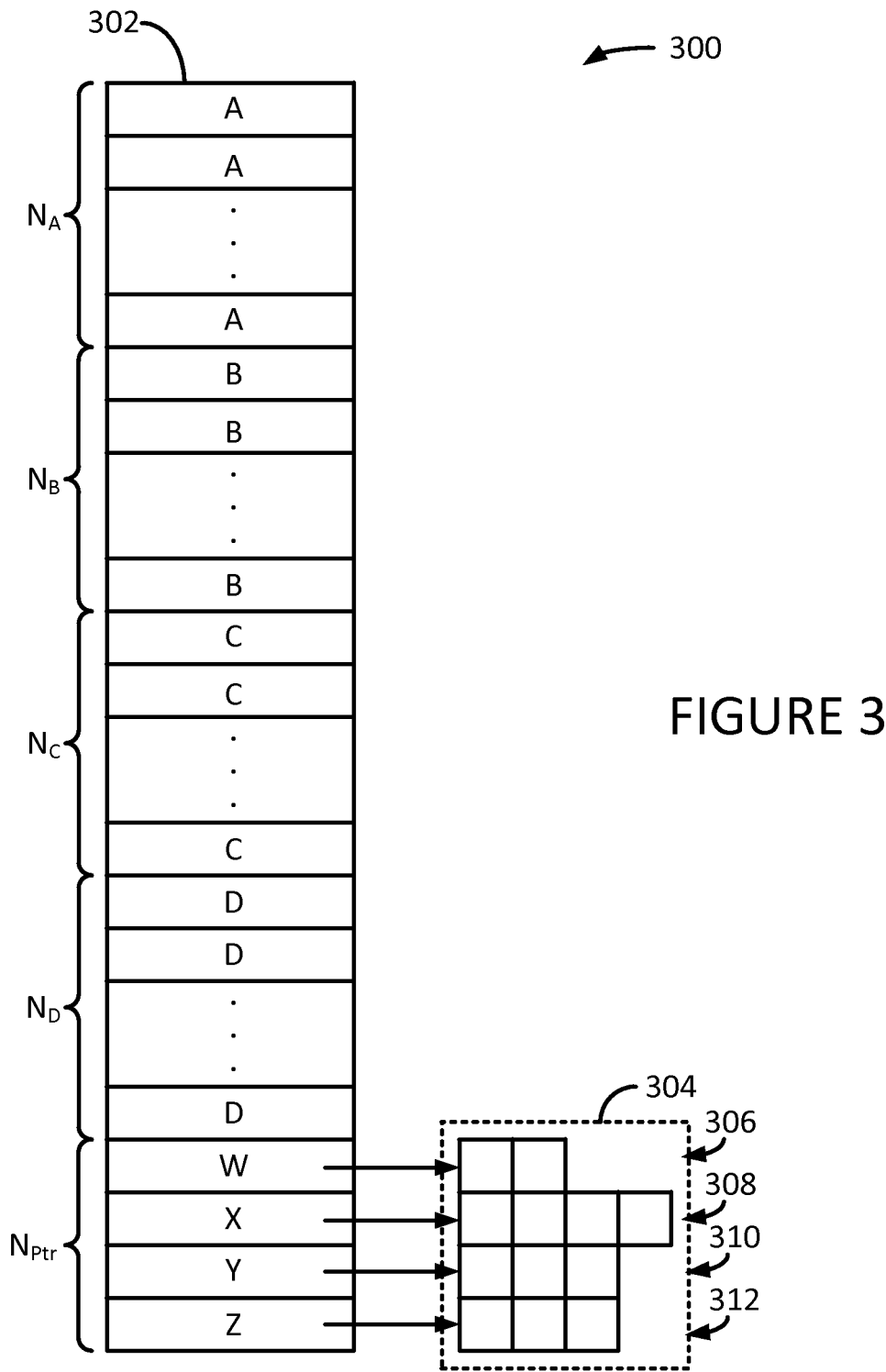
FIG. 3 shows an example two-level ECMP forwarding table for implementing weighted cost multi-pathing.

FIG. 3 shows a two-level ECMP forwarding table 300 for implementing weighted cost multi-pathing (WCMP). In particular, the two-level ECMP forwarding table 300 (or "the two-level ECMP table") includes a first level ECMP table 302 and a second level ECMP table 304. Each entry in the first level ECMP table 302 includes either an identifier for a single port or includes a pointer to entries in the second level ECMP table 304. As discussed below, the two-level ECMP table 300 can be used to implement WCMP with relatively fewer entries than the first example ECMP forwarding table 200 shown in FIG. 2. In some implementations, the two-level ECMP table 300 can be utilized by a switch, such as the switch S0 102 shown in FIG. 1.

The first level ECMP table 302 is similar to the ECMP table 200 shown in FIG. 2 in that both the first level ECMP table 302 and the ECMP table 200 include entries that identify only a single port. The first level ECMP table 302 includes $N_i$ entries that identify each port i. For example, the first level ECMP table 302 can include $N_A$ entries of port A, $N_B$ entries of port B, $N_C$ entries of port C, and $N_D$ entries of port D. While only four ports A, B, C, D, have been shown, it is understood that the first level table 302 may include entries for additional ports. However, unlike the ECMP table 200 shown in FIG. 2, the first level ECMP table also includes $N_{PTR}$ pointer entries that point to one or more entries in the second level ECMP table 304.

As mentioned above, the second level ECMP table 304 includes entries that identify one or more ports. For example, the second level ECMP table 304 can include a first entry 306 that includes two ports, a second entry 308 that includes four ports, and third and fourth entries 310 and 312 each includes three ports. The second level ECMP table 304 may include additional entries, and each entry may include one or more ports.

During operation, the switch, such as the switch S0 102, may receive a packet that is addressed to a destination address associated with the two-level ECMP table 300. The switch S0 102 can pseudo-randomly select one entry from the first level ECMP table 302. If the selected entry identifies a port, the switch S0 102 can transmit the received packet via the identified port. If the selected entry includes a pointer to one of the entries in the second level ECMP table 304, then the switch can again pseudo-randomly select one of the one or more ports identified by the selected entry in the second level ECMP table 304. The received packet can then be transmitted via the selected port from the second level ECMP table 304.

Figure 4:
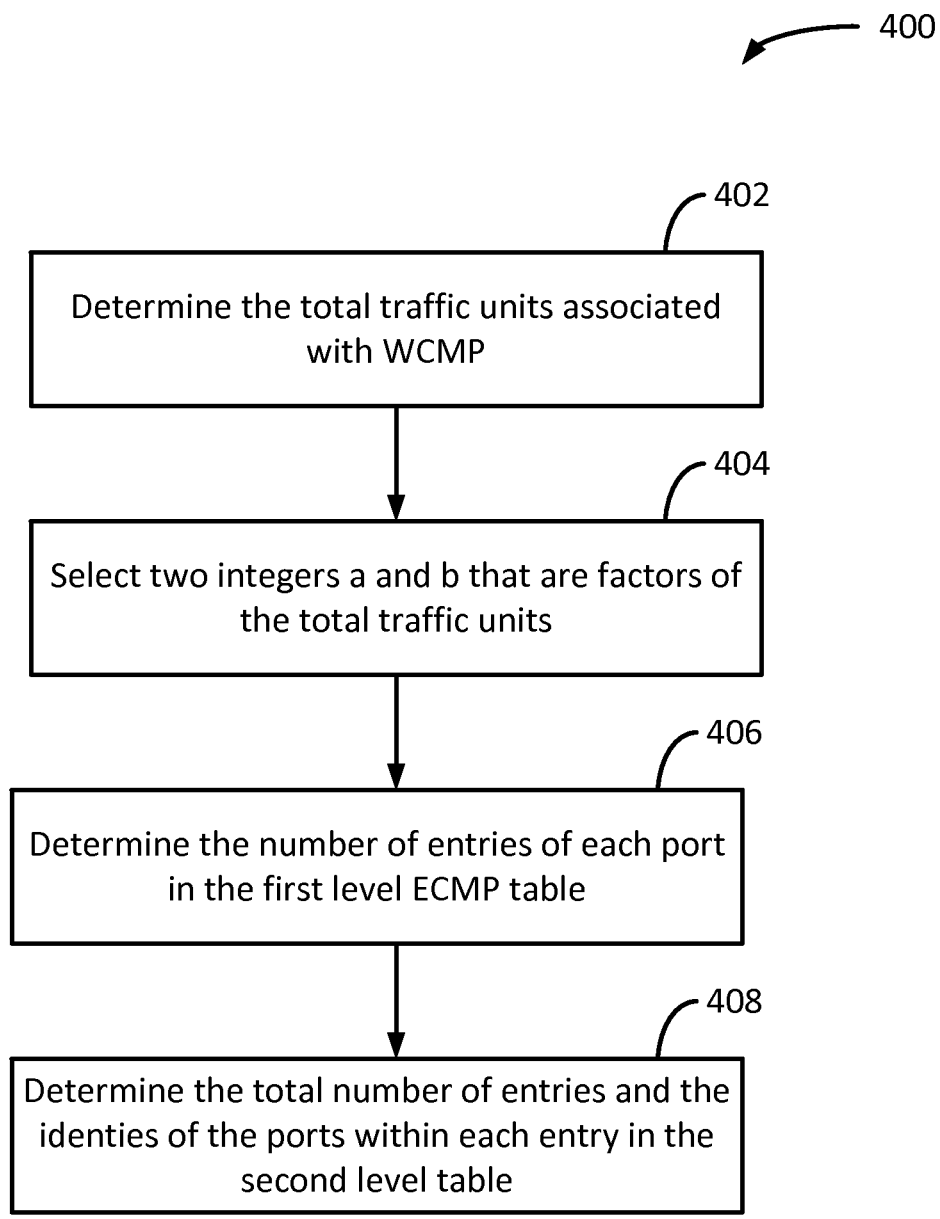
FIG. 4 shows a flow diagram of an example process for generating a two-level ECMP table shown in FIG. 3.

FIG. 4 shows a flow diagram of an example process 400 for generating a two-level ECMP table shown in FIG. 3. The process 400 includes determining the total traffic units associated with WCMP among a set of ports (step 402), selecting two integers that are factors of the total traffic units (step 404), determining the number of entries for each port in the first level ECMP table (step 406), and determining the number of entries and the identities of one or more ports within the entries in the second level table (step 408).

As indicated above, the process 400 includes determining the total traffic units ΣW associated with the WCMP among a set of ports. The total traffic units can be determined by summing the traffic units associated with each WCMP port. In some implementations, the number of traffic units W, for port i is equal to the value corresponding that port in the WCMP ratio. For example, for a WCMP weighted distribution ratio of 256:256:256:255 (discussed above in relation to FIGS. 1 and 2), each of port A 136, port B 138, and port C 140 has 256 associated traffic units, while port D has 255 associated traffic units. Thus, the total traffic ΣW for ports A-D 136-142 in the example above would be 1023.

The process 400 also includes selecting two integers that are factors of the total traffic units ΣW (step 404). For example, the process 400 can select two integers a and b, such that a×b=ΣW. In some implementations, the integers may be selected such that the selection results in the minimum possible value for |a−b|. In some implementations, the integer b can be selected to be larger than the integer a. In some implementations, the integer b can be smaller than the integer a. For example, the process 400 can select 33 and 31 as integers a and b, respectively (note that 33×31=1023). In some implementations, the integer b can indicate the number of entries in the first level ECMP table, such as the first level ECMP table 302 shown in FIG. 3. In other words, the integer b can indicate the sum $N_A + N_B + N_C + N_D + N_{PTR}$. In some implementations, integer a can indicate the highest number of individual port entries in the second level table, such as the second level table 304 shown in FIG. 3.

The process 400 further includes determining the number of entries for each port in the first level ECMP table (step 406). The number of entries dedicated to each port within the first level ECMP table can be determined by calculating the floor of the ratio of the total number of traffic units for each port to the integer a. For example, the total number of entries for port A can be determined by determining the floor of the division of 256 (the traffic units associated with port A) by 33 (integer a), which is equal to 7. Similarly, the number of entries for each of the ports B, C, and D would also be equal to 7. Generally, $$N_i = \text{Floor}\left(\frac{W_i}{a}\right),$$

where $N_i$ denotes the number of entries in the first level ECMP table for port i, while $W_i$, as discussed above, is the number of traffic units associated with port i.

The process 400 also includes determining the number of entries and the identities of one or more ports within the entries in the second level table (step 408). The number of entries $N_{PTR}$ in the first level ECMP table dedicated to the pointers can be determined by subtracting the total number of entries for all of the ports from the integer b. For example, referring again to the example discussed above, the total number of entries for the four ports A, B, C, and D is equal to 28. Therefore, the total number of entries for the pointers would be equal to 3. Thus, there can be three entries in the second level ECMP table 304, where each entry may include the identity of one or more ports (such as ports A, B, C, and D).

The process 400 also determines the number of traffic units remaining per port after the division by the integer a. For example, the remaining traffic units for port A, which had 256 traffic units, can be equal to (traffic units) mod integer a, or 256 mod 33=25. As the traffic units associated with ports B and C were also equal to 256, the remaining traffic units for ports B and C would also be equal to 25. But the traffic units associated with port D is equal to 255, therefore, the remaining traffic units for port D would be equal to 24. Thus, the ratio of the remaining number of traffic units for ports A, B, C, and D is 25:25:25:24.

The process 400 also includes determining the number and the identities of the ports in each of the entries in the second level ECMP table 304 (step 408). In some implementations, the number of times the ports are included in the second level ECMP table 304 can be determined such that the relative probabilities of selecting a port satisfies the ratio of the remaining number of traffic units determined above. Thus, for the above example, the distribution of the ports A, B, C, and D among the three entries of the second level ECMP table 304 may be selected such that the ratio of remaining traffic units: 25:25:25:24 is satisfied.

TABLE 1

|  | N (port A) | N (port B) | N (port C) | N (port D) |
| --- | --- | --- | --- | --- |
| Entry 1 | n1A | n1B | n1C | n1D |
| Entry 2 | n2A | n2B | n2C | n2D |
| Entry 3 | n3A | n3B | n3C | n3D |

Table 1 includes the number of times the identities of each of the ports A, B, C, and D can appear in each of the three entries of the second level ECMP table 304. Specifically, each column includes the number of times the identity of the respective port is included in each of the three entries (Entry 1, Entry 2, and Entry 3) of the second level ECMP table 304. For example, n1A, n2A, and n3A represent the number of times port A is included in Entry 1, Entry 2, and Entry 3, respectively; n1B, n2B, and n3B represent the number of times port B is included in Entry 1, Entry 2, and Entry 3, respectively; n1C, n2C, and n3C represent the number of times port C is included in Entry 1, Entry 2, and Entry 3, respectively; and n1D, n2D, and n3D represent the number of times port D is included in Entry 1, Entry 2, and Entry 3, respectively. Furthermore, N(Port A), N(Port B), N(Port C), and N(Port D) represent the total number of times port A, port B, port C, and Port D are included in the second level ECMP table 304. The total number of ports included within each of the entries Entry 1, Entry 2, and Entry 3, can be denoted by N1, N2, and N3, respectively.

The switch can pseudo-randomly (or with substantially equal probability) select one of the ports identified by a selected entry in the second level ECMP table 304. Thus, to achieve the desired relative probability of selecting a port, the number of times a port is included in each of the entries of the second ECMP table 304 satisfies the ratio of the remaining number of traffic units. This can be expressed by Equation 1 below:

$$A:B:C:D = \left(\frac{n1A}{N1} + \frac{n2A}{N2} + \frac{n3A}{N3}\right) : \left(\frac{n1B}{N1} + \frac{n2B}{N2} + \frac{n3B}{N3}\right) : \quad \text{(Equation 1)}$$
$$\left(\frac{n1C}{N1} + \frac{n2C}{N2} + \frac{n3C}{N3}\right) : \left(\frac{n1D}{N1} + \frac{n2D}{N2} + \frac{n3D}{N3}\right)$$

It is understood that more than one set of values for n1A, n2A, n3A, n1B, n2B, n3B, n1C, n2C, n3C, n1D, n2D, and n3D may satisfy the desired ratio of remaining traffic units A:B:C:D.

In some implementations, a set of values shown below in Table 2 can be utilized to determine the number of times each port is included in each of the three entries in the second level ECMP table:

TABLE 2

|         | N (port A)  | N (port B)  | N (port C)  | N (port D)  |
|---------|-------------|-------------|-------------|-------------|
| Entry 1 | n1A = 25    | n1B = 25    | n1C = 25    | n1D = 24    |
| Entry 2 | n2A = 25    | n2B = 25    | n2C = 25    | n2D = 24    |
| Entry 3 | n3A = 0     | n3B = 0     | n3C = 0     | n3D = 0     |

In the example shown in Table 2, port A, port B, and port C are included 25 times each in both Entry 1 and Entry 2 of the second level ECMP table 304. Port D is included 24 times in both Entry 1 and Entry 2. Entry 3 does not include any of port A-D. Applying the values shown in Table 2 to Equation 1 results in:

$$A:B:C:D=(25/99+25/99):(25/99+25/99):(25/99+25/99):(24/99+24/99)=25:25:25:24.$$

Thus, the set of values shown in Table 1 satisfy the ratio of the remaining number of traffic units. In should be noted that as Entry 3 does not include any ports, the effective size of the first level ECMP table would become 30, of which 28 entries include single ports, while two entries include pointers to two corresponding entries in the second level ECMP table. The size of the two-level ECMP table would be equal to 31+198=229. Thus, the size of the two-level ECMP table is substantially smaller than the one level ECMP table 200 shown in FIG. 2, which had a size of 1023.

In some other implementations, different values for n1A, n2A, n3A, n1B, n2B, n3B, n1C, n2C, n3C, n1D, n2D, and n3D can be used. For example, a set of values can be selected that result in a minimum size of the second level ECMP table 304. In other words, from all possible sets of values, one set of values that results in a minimum value for N1+N2+N3+N4 can be selected. One such set of values is shown in FIG. 5.

Figure 5:
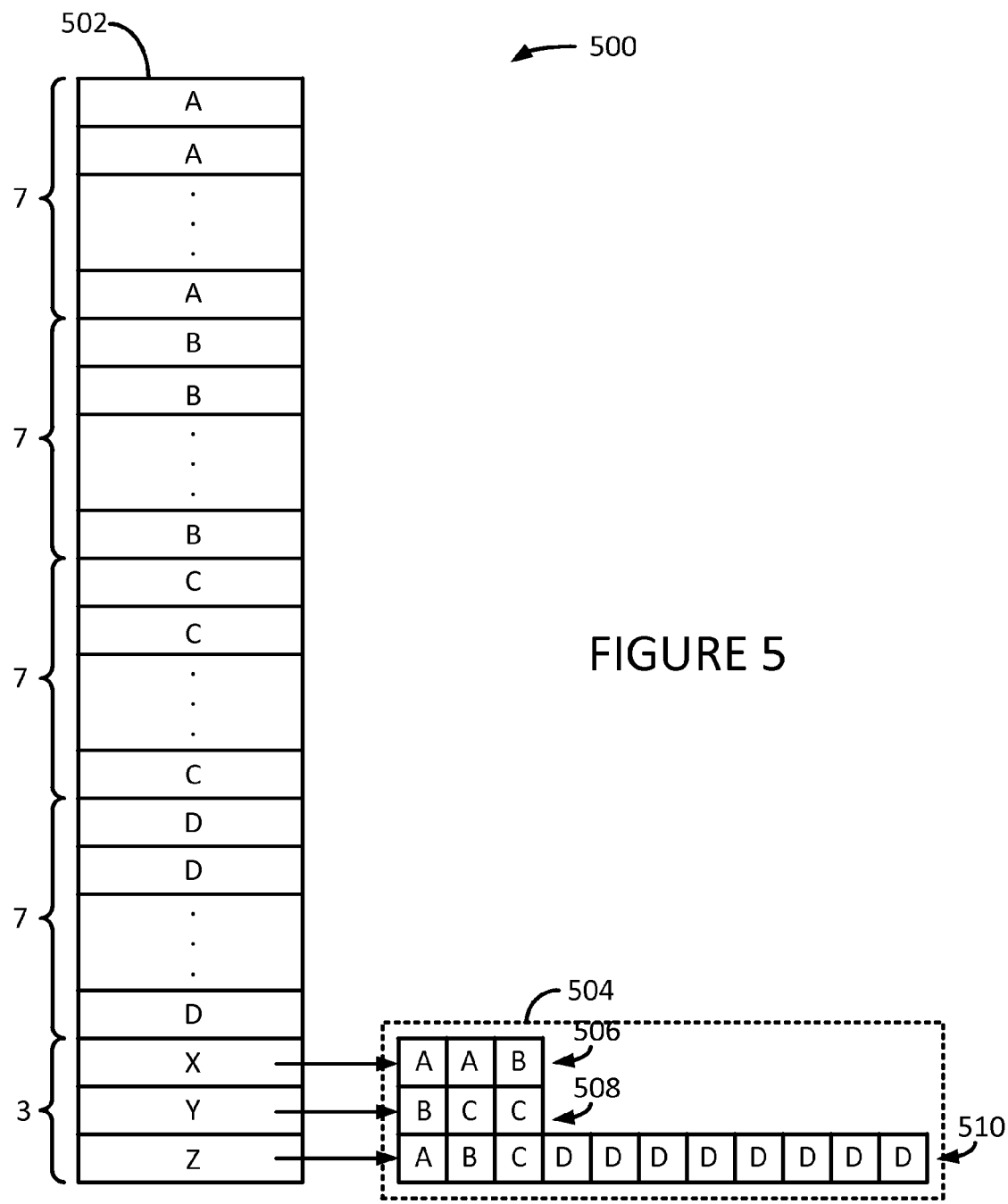
FIG. 5 shows another example two-level ECMP table.

FIG. 5 shows another example two-level ECMP table 500. In particular, FIG. 5 shows the two-level ECMP table 502 as a result of the process 400 shown in FIG. 4 using the weighted distribution ratio of 256:256:256:255 and integers a=33 and b=31 as factors of 1023 total traffic units. Specifically, the two-level ECMP table 500 includes a first level ECMP table 502 and a second level ECMP table 504. As determined above in steps 406 and 408 shown in FIG. 4, the first level ECMP table 502 includes 31 entries, 7 entries of which include port A, another 7 entries include port B, 7 entries include port C, while the next 7 entries include port D. The remaining three entries include pointers X, Y, and Z to entries in the second level ECMP table 504. For example pointer X points to a first entry 506, pointer Y points to a second entry 508, and pointer Z points to a third entry 510 in the second level ECMP table 504.

The second level ECMP table 504 includes entries with more than one port. The second level ECMP table includes particular values for the number of times each port is included in each entry such that the resulting second level ECMP table is of the smallest possible size for a given ratio of remaining traffic units. For example, the first entry 502 includes port A twice, and port B once, the second entry 504 includes port B once and port C twice, and the third entry 506 includes each of the ports A, B, and C once and port D eight times. Applying these values to Equation 1 above results in: A:B:C:D=⅔+ 1/11: ⅓+⅓+ 1/11:⅔+ 1/11:8/11=25:25:25:24. Thus, the selected values for the number of times each port appears in each of the three entries in the second level table satisfies the desired ratio of remaining traffic units.

In some implementations, the switch S0 102 may pseudo-randomly select any one of the entries in the first level ECMP table 502. If the selected entry is a pointer to an entry in the second level ECMP table 504, then the switch S0 102 may pseudo-randomly select one of the multiple ports within the entry in the second ECMP table 504. For example, if the third entry 510 of the second level ECMP table 504 is selected, then the switch S0 102 can pseudo-randomly select a port from among eight port Ds, and one each of ports A, B, and C.

It should be noted that despite utilizing the two-level ECMP table 500, as opposed to utilizing the ECMP table 200 shown in FIG. 2, the weighted distribution ratio is maintained. For example, the probability of selecting port A from the two-level ECMP table 500 can be determined as P(A)=P(A being selected in the first level ECMP table)+P (A being selected in the second level ECMP table). As there are 7 occurrences of port A within 31 entries of the first level ECMP table, the probability of port A being selected in the first ECMP level table is 7/31. As there are 2, 0, and 1 occurrences of port A in the three entries of the second level ECMP table, the probability of port A being selected from the second level ECMP table 504 would be 1/31 (⅔+ 1/11). Thus, P(A)=256/1023. In a similar manner, the probability of ports B, C, and D being selected from the two-level ECMP table 500 can be determined to be 256/1023, 256/1023, and 255/1023, respectively. This indicates that the weighted distribution ratio of 256:256:256:255 is maintained.

The two-level ECMP table 500, however, uses a total of only 48 entries as compared to the total of 1023 entries used by the ECMP table 200 shown in FIG. 2. Thus, using the two-level ECMP table for implementing WCMP can avoid hardware constraints associated with the implementation of WCMP using the single level ECMP table 200.

In some implementations, the two-level ECMP table 500 can be generated while setting an upper bound to the number of port entries in the second level ECMP table. For example, the upper bound for the total number of port entries in the two-level ECMP table 500 can be determined by multiplying the integer a with the total number of different ports. In the example discussed above, the total number of different ports is four, while the integer a is equal to 33. Therefore, the upper bound to the number of port entries in the second level ECMP table 504 would be 132. Despite an upper bound of 132 the second level ECMP table 504, as shown in FIG. 5, includes only 17 port entries.

In some implementations, the integer a can be pre-selected based on the desired upper bound, instead of being determined along with integer b as discussed above in step 404. In such implementations, the integer b could be determined by dividing the total traffic units by the pre-selected integer a. For example, if the integer a were to be equal to 3, then the upper bound on the number of port entries in the second level table 504 would be 12. In such an example, the two-level ECMP table would include 85 occurrences of each of ports A, B, C, and D in the first level ECMP table 502, while the second level ECMP table 504 would include one occurrence each of ports A, B, and C.

In some implementations, discussed above, the size of the first level ECMP table 302 is determined by the integer b. In some such implementations, the value of the integer b is calculated by determining two integers a and b that are factors of ΣW such that |a−b| is as small as possible. Thus, the value of the integer b is not directly selected. In another approach, the value of the integer b can be pre-selected, and the remaining parameters can be determined based on the preselected value of the integer b. The pre-selected value of the integer b can be used as an upper limit to the size of the first level ECMP table 302.

For example, integer b can be selected to be equal to 11 to reflect the upper bound for the number of entries in the first level ECMP table 302. Therefore, the value of integer a can be selected to be equal to 1023/11=93. Out of the 11 entries in the first level ECMP table 302, two entries each would include one of the four ports A, B, C, D, while three entries would include pointers to entries in the second level ECMP table 304. As discussed above, the remaining traffic units associated with each port can be determined by calculating the (traffic units) mod integer a. Thus, for ports A, B, and C the remaining traffic units would be equal to 256 mod 93=70. Similarly, the remaining traffic units corresponding to port C would be 255 mod 93=69.

Thus, the ratio of the remaining traffic units would be equal to 70:70:70:69. The number of times each port is included in each of the three entries in the second level ECMP table 304 would have to satisfy the ratio 70:70:70:69. In some implementations, the second level ECMP table 304 can be configured such that in Entry 1, Port A is included 70 times and port D is included 23 times, in Entry 2, port B is included 70 times and port D is included 23 times, and finally in Entry 3 port C is included 70 times and port D is again included 23 times. This distribution of ports among the entries of the second level ECMP table satisfies the ratio 70:70:70:69. It is understood that other values for the number of times the ports are included in each entry that satisfy the ratio 70:70:70:69 can also be utilized.

Figure 6:
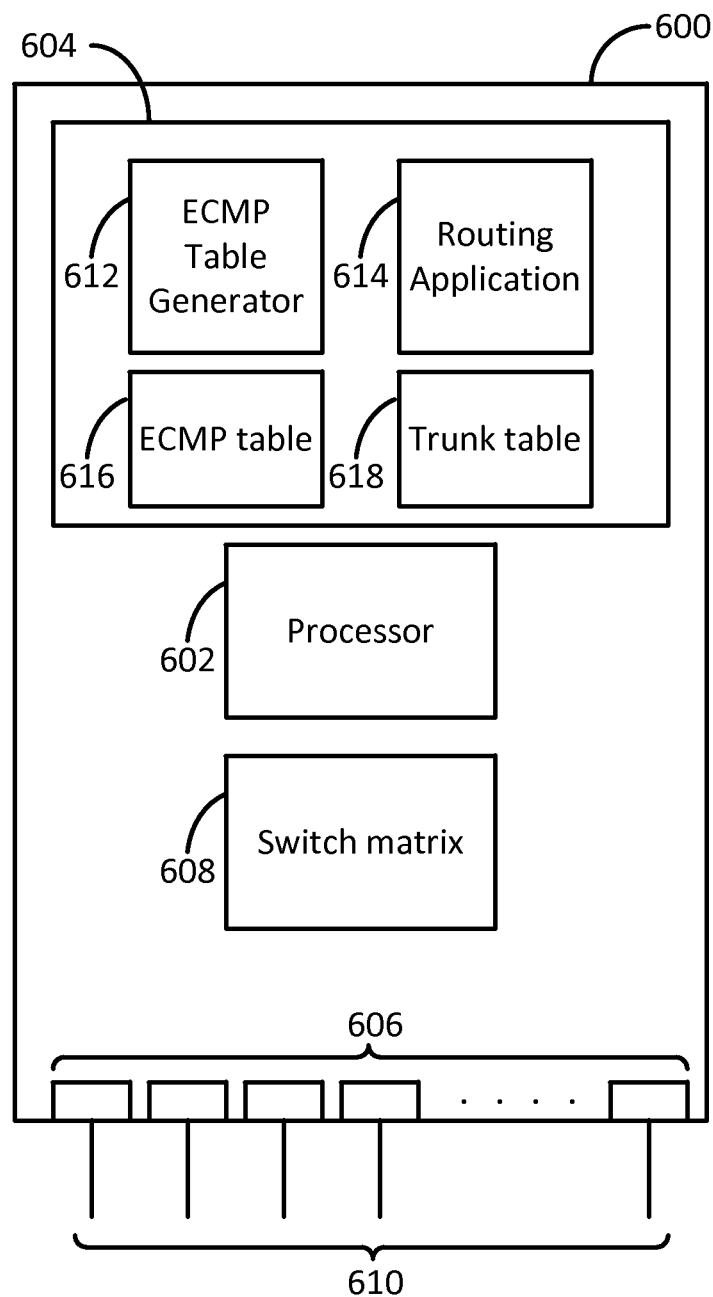
FIG. 6 shows an example block diagram of a switch.

FIG. 6 shows an example block diagram of a switch 600. In particular, the switch 600 is configured to implement WCMP using multi-level ECMP tables. In some implementations, the switch 600 may be utilized as, for example, any one of the four switches S0 102, S1 104, S2 106, S3 108, and S4 110 shown in FIG. 1.

The switch 600 can include a processor 602, memory 604, network ports 606, and a switch matrix 608. The processor 602 can include any logic circuitry that processes instructions such as, but not limited to, microprocessors, microcontrollers, programmable logic arrays, etc., implemented as application specific integrated circuits (ASICs), field programmable gate arrays (FPGAs), etc. In some implementations, the processor 602 may include multiple processors. The processor 602 can be capable of multi-processing, multi-tasking, multi-threading, and generally be capable of concurrently executing more than on application. The processor 602 can communicate with the memory 604, the network ports 606, and the switch matrix 608 via data and control buses (not shown).

The memory 604 can be any device capable of storing computer readable data. The memory 604 may be a device with fixed storage or a device for reading removable storage media. Examples include all forms of non-volatile memory, media and memory devices, semiconductor memory devices (e.g., EPROM, EEPROM, and flash memory devices, RAM, content addressable memory (CAM), etc.), magnetic disks, magneto optical disks, and optical discs (e.g., CD ROM, DVD-ROM, and Blu-Ray® discs). The switch 600 may have any number of devices implementing memory 604.

The switch 600 can utilize the network ports 606 for communicating data with other computing devices over the network. In some implementations, the network ports 606 can be utilized as, for example, ports A-D 136-142 shown in FIG. 1. The network ports can connect to a network via network links 610. In some implementations, the network ports 606 can implement several network layers of the Open Systems Interconnection (OSI) network model. For example, the network ports 606 can include Ethernet ports with assigned Ethernet addresses for implementing a data link layer. The switch 600 can also include a switch matrix 608 that can be configured by the processor 602 to provide interconnection between the network ports 606. In some implementations, the switch matrix 608 can be a crossbar switch.

The memory 604 can include application code and data. In some implementations, the memory 604 can include an ECMP table generator application 612. In some implementations, the ECMP table generator application 612 can include a set of instructions for generating a two-level ECMP table, such as the one shown in FIG. 5. In some implementations, the ECMP table generator may execute the process 400 shown above in FIG. 4. The memory 604 can also include a routing application 614 for generating routing tables, determining routing costs, determining ECMP and WCMP groups, etc.

The memory 604 can also include an ECMP forwarding table 616. In some implementations, the ECMP forwarding table 616 may be similar to the two-level ECMP table 500 discussed above in relation to FIG. 5. The memory 604 may also include a trunk table 618 that can store information regarding inter-switch links or link aggregation. The trunk table 618 may include the identities of the ports 606 that have been aggregated to form inter-switch links with one or more neighboring switches. In some implementations, the ECMP forwarding table 616 may include only the first level ECMP table 502 shown in FIG. 5. In some such implementations, the second level ECMP table 504 may be stored in the trunk table 618.

Figure 7:
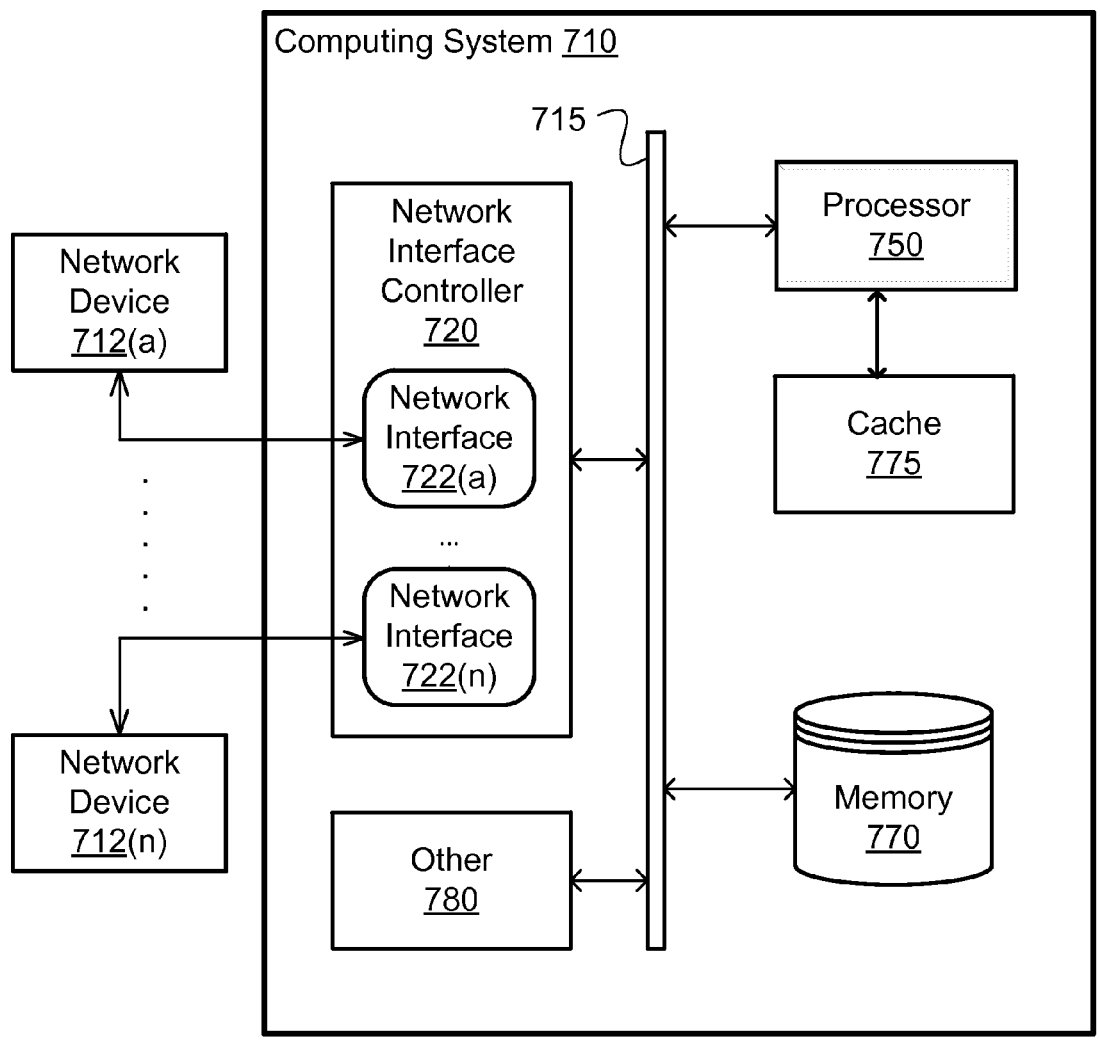
FIG. 7 shows a block diagram of an example computing system.

FIG. 7 shows a block diagram of an example computing system 710. In some implementations, the computing system 710 may be utilized in implementing one or more of the switches S0-S4 102-110 shown in FIG. 1. In some other implementations, the computing system 710 may also by utilized for implementing the switch 600 shown in FIG. 6. In broad overview, the computing system 710 includes at least one processor 750 for performing actions in accordance with instructions and one or more memory devices 770 or 775 for storing instructions and data. The illustrated example computing system 710 includes one or more processors 750 in communication, via a bus 715, with at least one network interface controller 720 with network interface ports 722($a$-$n$) connecting to network devices 712($a$-$n$), memory 770, and any other devices 780, e.g., an I/O interface. Generally, a processor 750 will execute instructions received from memory. The processor 750 illustrated incorporates, or is directly connected to, cache memory 775.

In more detail, the processor 750 may be any logic circuitry that processes instructions, e.g., instructions fetched from the memory 770 or cache 775. In many embodiments, the processor 750 is a microprocessor unit or special purpose processor. The computing device 710 may be based on any processor, or set of processors, capable of operating as described herein. In some implementations, the processor 750 can be capable of executing the process 400 shown in FIG. 4. The processor 750 may be a single core or multi-core processor. The processor 750 may be multiple processors.

The memory 770 may be any device suitable for storing computer readable data. The memory 770 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 710 may have any number of memory devices 770. In some implementations, the memory 770 can include instructions corresponding to the process 400 shown in FIG. 4.

The cache memory 775 is generally a form of computer memory placed in close proximity to the processor 750 for fast read times. In some implementations, the cache memory 775 is part of, or on the same chip as, the processor 750. In some implementations, there are multiple levels of cache 775, e.g., L2 and L3 cache layers.

The network interface controller 720 manages data exchanges via the network interfaces 722(a-n) (also referred to as network interface ports). The network interface controller 720 handles the physical and data link layers of the OSI model for network communication. In some implementations, some of the network interface controller's tasks are handled by the processor 750. In some implementations, the network interface controller 720 is part of the processor 750. In some implementations, a computing system 710 has multiple network interface controllers 720. The network interfaces 722(a-n) are connection points for physical network links. In some implementations, the network interface controller 720 supports wireless network connections and an interface port 722 is a wireless receiver/transmitter. Generally, a computing device 710 exchanges data with other computing devices 712(a-n) via physical or wireless links to a network interfaces 722(a-n). In some implementations, the network interface controller 720 implements a network protocol such as Ethernet. In some implementations, one or more of the network interfaces 722(a-n) can be utilized for implementing one or more of ports A-D 136-142 in switch S0 102 shown in FIG. 1.

The other computing devices 712(a-n) are connected to the computing device 710 via a network interface port 722. The other computing devices 712(a-n) may be peer computing devices, network devices, or any other computing device with network functionality. For example, a first computing device 712(a) may be a network device such as a hub, a bridge, a switch, or a router, connecting the computing device 710 to a data network such as the Internet. In some implementations, the other computing devices can be utilized to implement switches S1-S4 104-110 shown in FIG. 1.

The other devices 780 may include an I/O interface, external serial device ports, and any additional co-processors. For example, a computing system 710 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 710 includes an additional device 780 such as a co-processor, e.g., a math co-processor can assist the processor 750 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for generating a forwarding table for a packet switch, comprising:
    receiving identities of a plurality of switch output ports associated with at least one destination network address;
    receiving weights associated with each of the plurality of switch output ports; and
    generating a multi-level equal cost multipath (ECMP) forwarding table based on the number of the plurality of switch output ports and the received weights,
    wherein a first level of the multi-level ECMP forwarding table includes:
        at least one entry including the identity of only one of the plurality of switch output ports, and
        at least one entry including a pointer to an entry in a second level of the multi-level ECMP forwarding table, wherein the entry in the second level includes identities of at least two switch output ports.

2. The method of claim 1, wherein generating the multi-level ECMP forwarding table includes generating the second level of the multi-level ECMP forwarding table having more than one of the plurality of switch output ports in at least one of its entries.

3. The method of claim 2, wherein the generating the second level of the multi-level ECMP forwarding table includes storing the second level in a trunk table of a switch.

4. The method of claim 2, wherein generating the first level of the multi-level ECMP forwarding table includes:
    summing the weights associated with each of the plurality of switch output ports to determine a total number of traffic units;
    determining a pair of integers a and b such that a times b equals the total number of traffic units; and
    equating a number of entries of the first level of the multi-level ECMP table to integer b.

5. The method of claim 4, wherein generating the first level of the multi-level ECMP forwarding table further includes:
    determining the number of entries allocated to each of the plurality of switch output ports by determining a floor of a ratio of the total number of traffic units to the integer a.

6. The method of claim 4, wherein generating the second level of multi-level ECMP forwarding table entries includes:
    determining a remaining number of traffic units associated with each of the plurality of switch output ports by determining a remainder of a division of the weight associated with the respective switch output port by the integer a; and
    determining a number of entries in the second level of the ECMP table and the number of switch output ports identified in each of the number of entries in the second level of the ECMP table based on the integer b, the number of entries in the first level of the ECMP table, and the remaining number of traffic units associated with each of the plurality of switch output ports.

7. A packet network switch comprising:
    a plurality of network ports configured to communicate data over one or more networks;
    a switch matrix coupled to the plurality of network ports and configured to selectively couple any one of the plurality of network ports to another one of the plurality of network ports; and
    a forwarding table generating module configured to:
        receive identities of the plurality of network ports associated with at least one destination network address;
        receive weights associated with each of the plurality of network ports; and
        generate a multi-level ECMP forwarding table based on the number of the plurality of network ports and the received weights,
        wherein a first level of the multi-level ECMP forwarding table includes:
            at least one entry including the identity of only one of the plurality of network ports, and
            at least one entry including a pointer to an entry in a second level of the multi-level ECMP forwarding table, wherein the entry in the second level includes identities of at least two network ports.

8. The packet network switch of claim 7, wherein the second level of the multi-level ECMP forwarding table includes more than one of the plurality of network ports in at least one or its entries.

9. The packet network switch of claim 8, wherein the forwarding table generating module is further configured to store the second level of the multi-level ECMP forwarding table in a trunk table of the packet network switch.

10. The packet network switch of claim 8, wherein the forwarding table generating module is further configured to:
    sum the weights associated with each of the plurality of network ports to determine a total number of traffic units;
    determine a pair of integers a and b such that a times b equals the total number or traffic units; and
    equating a number of entries of the first level of the multi-level ECMP table to integer b.

11. The packet network switch of claim 10, wherein the forwarding table generating module is further configured to determine the number of entries allocated to each of the plurality of network ports by determining a floor of a ratio of the total number of traffic units to the integer a.

12. The packet network switch of claim 10, wherein the forwarding table generating module is further configured to:
    determine a remaining number of traffic units associated with each of the plurality of network ports by determining a remainder of a division of the weight associated with the respective network port by the integer a; and
    determine a number of entries in the second level of the ECMP table and the number of network ports identified in each of the number of entries in the second level of the ECMP table based on the integer b, the number of entries in the first level of the ECMP table, and the remaining number of traffic units associated with each of the plurality of network ports.

* * * * *